United States Patent
Abaquita

(10) Patent No.: US 10,567,615 B2
(45) Date of Patent: Feb. 18, 2020

(54) IMAGE FORMING APPARATUS

(71) Applicant: KYOCERA Document Solutions Inc., Osaka (JP)

(72) Inventor: Earl John Abaquita, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/235,607

(22) Filed: Dec. 28, 2018

(65) Prior Publication Data

US 2019/0230246 A1 Jul. 25, 2019

(30) Foreign Application Priority Data

Jan. 25, 2018 (JP) ................................. 2018-010415

(51) Int. Cl.
*H04N 1/387* (2006.01)
*H04N 1/00* (2006.01)

(52) U.S. Cl.
CPC ....... *H04N 1/3876* (2013.01); *H04N 1/00411* (2013.01); *H04N 1/387* (2013.01); *H04N 1/3872* (2013.01); *H04N 1/3877* (2013.01); *H04N 2201/0434* (2013.01)

(58) Field of Classification Search
CPC .... B42D 2033/46; B42D 25/00; B42D 25/24; B42D 25/46; G06K 19/025; G06K 19/077; G06K 19/07749; Y10S 283/901; H04N 2201/10081; H04N 1/00588; H04N 2201/0094; H04N 1/12
USPC ........................................ 358/474, 498, 496
See application file for complete search history.

(56) References Cited

U.S. PATENT DOCUMENTS

| | | | | |
|---|---|---|---|---|
| 5,159,390 A | * | 10/1992 | Imaizumi | G03G 15/04 399/204 |
| 2002/0027675 A1 | * | 3/2002 | Minato | H04N 1/00214 358/1.15 |
| 2005/0073733 A1 | | 4/2005 | Kim | 358/528 |
| 2007/0182154 A1 | * | 8/2007 | Hoeppner | G06K 19/025 283/72 |
| 2009/0257178 A1 | * | 10/2009 | Sheng | G03G 15/605 361/679.01 |
| 2011/0038003 A1 | * | 2/2011 | Nakamura | G06F 3/1208 358/1.15 |
| 2012/0206778 A1 | * | 8/2012 | Shirai | H04N 1/3873 358/474 |
| 2016/0161904 A1 | * | 6/2016 | Matsuda | G03G 15/6552 399/91 |

(Continued)

FOREIGN PATENT DOCUMENTS

JP 2005-117666 A 4/2005

*Primary Examiner* — Negussie Worku
(74) *Attorney, Agent, or Firm* — Stein IP, LLC

(57) ABSTRACT

The image forming apparatus sets, as a cutting area, an area containing an image of a double-page spread out of image data obtained by a scan of a book-type document, sets a borderline which divides an area corresponding to one page of the image data and an area corresponding to the other page of the image data from each other, and divides the cutting area cut out from the image data into a one-side area of the borderline and the other-side area of the borderline, thereby generating a first pre-output page in which divided image data of the one-side area is provided and a second pre-output page in which divided image data of the other-side area is provided.

6 Claims, 15 Drawing Sheets

(56) References Cited

U.S. PATENT DOCUMENTS

2016/0223946 A1\* 8/2016 Kikuchi ............. G03G 15/0865
2018/0160009 A1\* 6/2018 Pantin ................ H04N 1/32122

\* cited by examiner

FIG.3
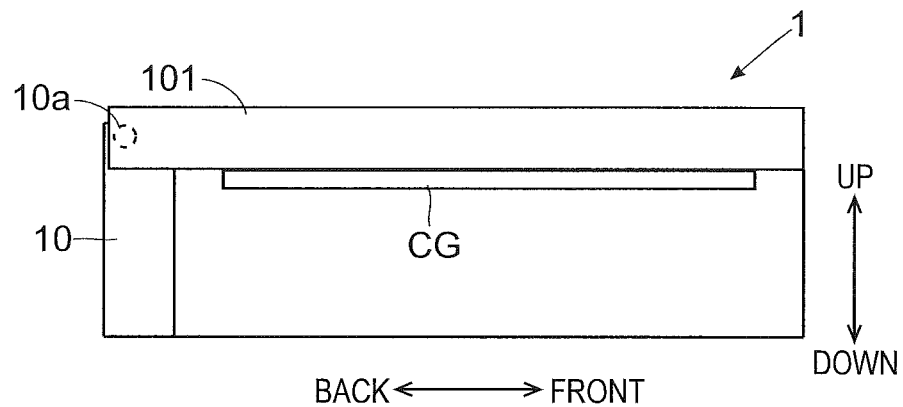
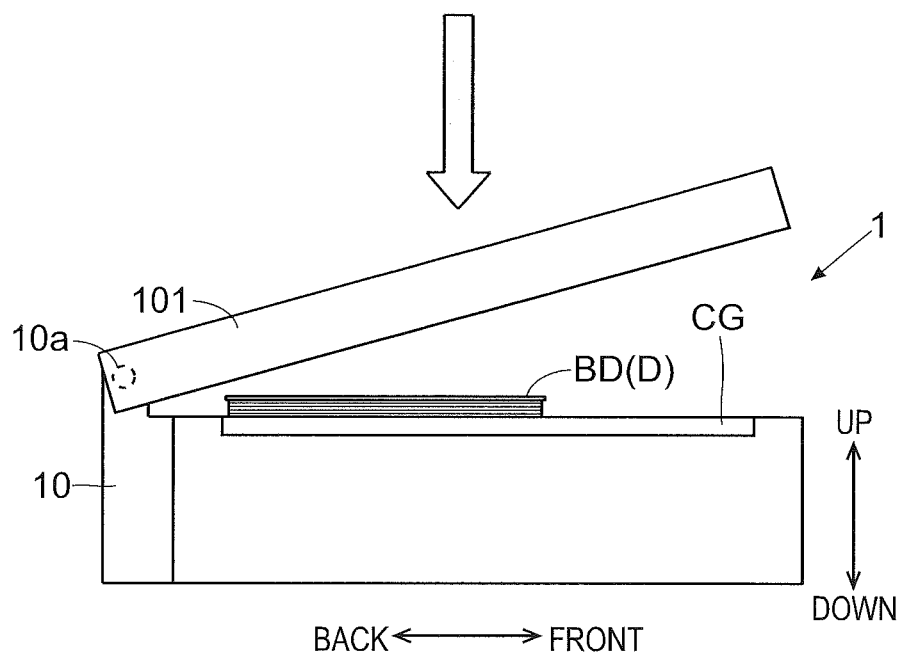
FIG.4
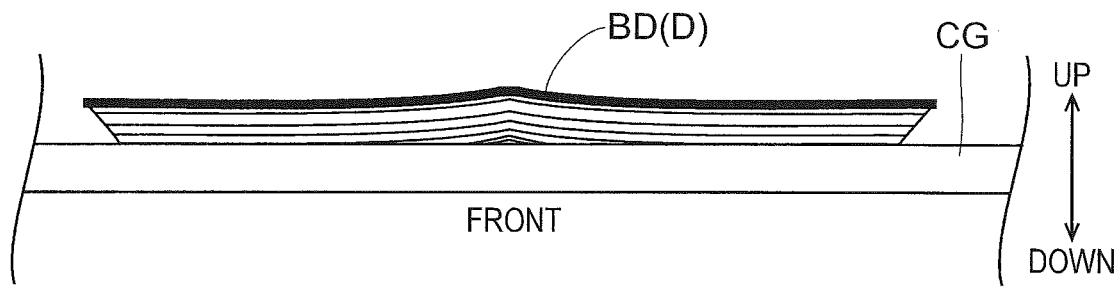

IMAGE FORMING APPARATUS

INCORPORATION BY REFERENCE

This application is based upon and claims the benefit of priority from the corresponding Japanese Patent Application No. 2018-010415, filed on Jan. 25, 2018, the entire contents of which are incorporated herein by reference.

BACKGROUND

The present disclosure relates to an image forming apparatus including an image reading section for scanning documents.

Conventionally, there is known an image forming apparatus including an image reading section for scanning documents. A contact glass is provided in such an image forming apparatus. Then, the image forming apparatus scans a document set on the contact glass to generate image data of the document.

For example, when a job of scanning one page and the other page of a double-page spread in a book-like document (e.g., a book) is to be executed by the image forming apparatus, a user first sets the one page on the contact glass, making the image forming apparatus scan the page as it is, and then sets the other page on the contact glass, making the image forming apparatus scan the page as it is. As a result of this, divided pre-output pages (pages to be outputted) can be derived correspondingly from a double-page spread in such a division as a first pre-output page with image data of the one page provided thereon and a second pre-output page with image data of the other page provided thereon. Thus, it is implementable to print out individual images of the one page and the other page on different sheets, respectively, or to display the individual images of the one page and the other page separately from each other.

In this connection, after completion of the scanning of the one page by the image forming apparatus and before starting of the scanning of the other page by the image forming apparatus, the user commonly rotates the double-page spread by 180° to set the other page on the contact glass as it is. Therefore, image data of the other page results in a 180°-rotated state, compared with the image data of the one page. That is, the image data provided on the first pre-output page corresponding to the one page and the image data provided on the second pre-output page corresponding to the other page result in a mutually incongruous orientational state.

Accordingly, the conventional image forming apparatus is preparatorily equipped with a book scan mode. While an enable setting for the book scan mode is in effect, the conventional image forming apparatus decides whether one page (left-side page) of a double-page spread of a book-type document has been scanned or the other page (right-side page) has been scanned. Then, when the other page has been scanned, the conventional image forming apparatus rotates image data of the other page by 180°.

SUMMARY

An image forming apparatus according to the present disclosure includes an image reading section, and a control section. The image reading section scans a double-page spread of a book-type document set on a contact glass. The control section generates a pre-output page based on image data obtained by scanning by the image reading section. The control section sets, as a cutting area, an area containing an entire document area in which an image of the double-page spread is present out of image data obtained by scanning by the image reading section, sets a borderline which divides an area corresponding to one page of the double-page spread out of the image data and an area corresponding to the other page of the double-page spread from each other, and divides the cutting area cut out from the image data obtained by the scanning by the image reading section into a one-side area of the borderline and the other-side area of the borderline, thereby generating, as pre-output pages, a first pre-output page in which divided image data of the one-side area is provided and a second pre-output page in which divided image data of the other-side area is provided.

BRIEF DESCRIPTION OF THE DRAWINGS

FIG. 3 is a view showing a state of a document cover with a book-type document set to the image reading section in the image forming apparatus according to one embodiment of the disclosure;

FIG. 4 is a view of a state in which a book-type document has been set to the image reading section in the image forming apparatus according to one embodiment of the disclosure, as viewed from the apparatus front;

DETAILED DESCRIPTION

<Configuration of Image Forming Apparatus>

Figure 1:
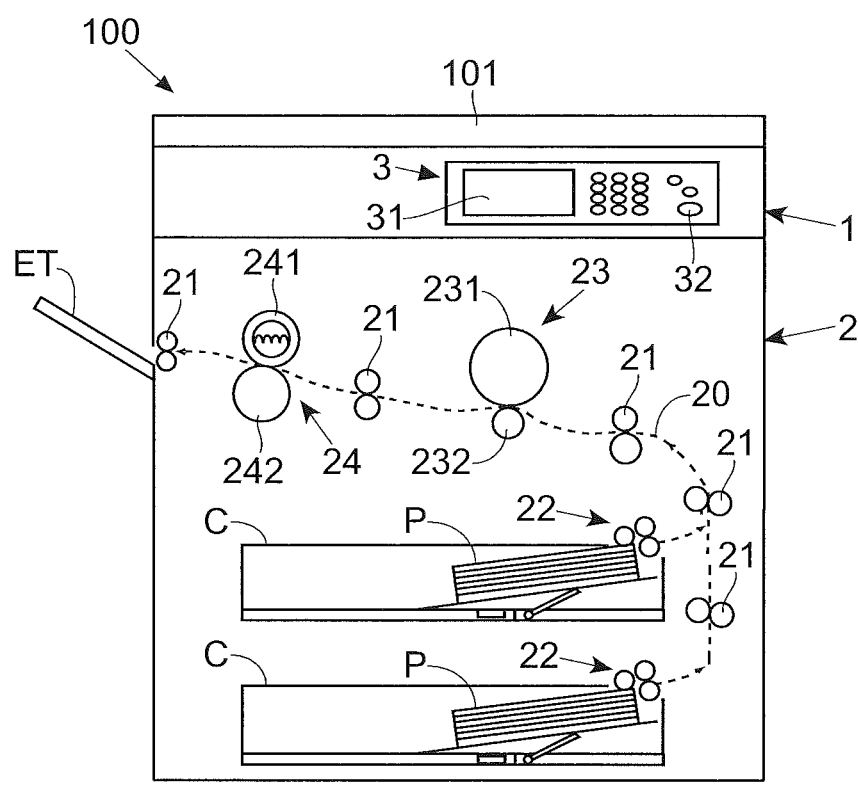
FIG. 1 is a schematic view showing a configuration of an image forming apparatus according to one embodiment of the present disclosure.

As shown in FIG. 1, an image forming apparatus 100 of this embodiment includes an image reading section 1 and a printing section 2. The image forming apparatus 100 is also equipped with an operation panel 3.

Figure 2:
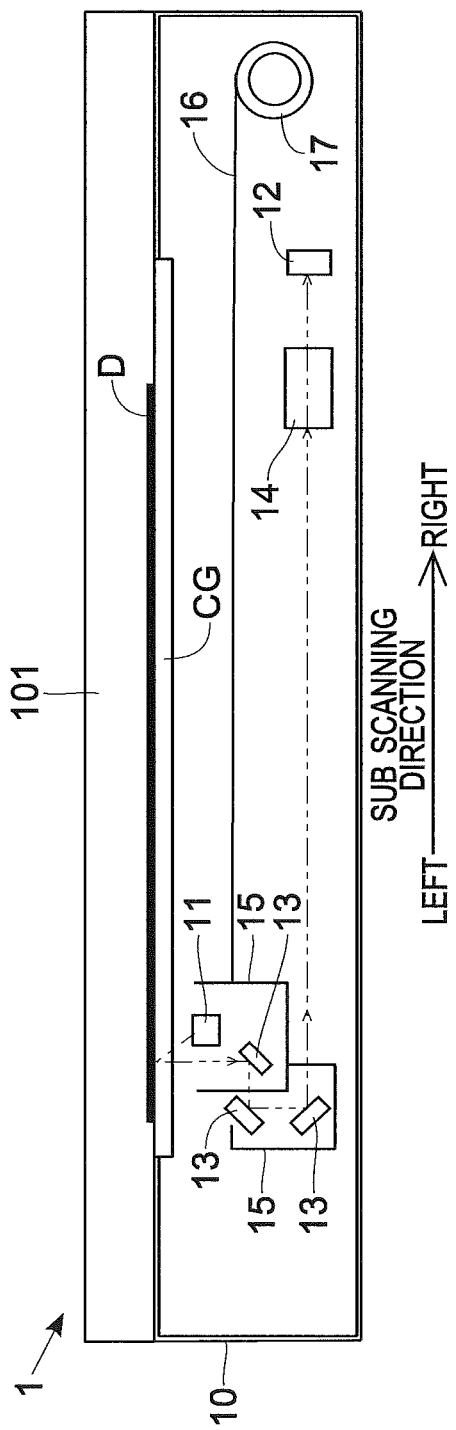
FIG. 2 is a view showing a configuration of an image reading section in the image forming apparatus according to one embodiment of the disclosure.

The image reading section 1 includes a contact glass CG as shown in FIG. 2. The contact glass CG is placed at an opening formed in a top face of a housing 10 of the image reading section 1. The image reading section 1 scans a document D set on the contact glass CG.

The image reading section 1 includes a light source 11, an image sensor 12, mirrors 13, and a lens 14. These members of the image reading section 1 are housed inside the housing 10 of the image reading section 1 (placed on a lower-surface side opposite to an upper-surface side of the contact glass CG).

The light source 11 has a plurality of LED elements (not shown). The plurality of LED elements are arrayed in line along a main scanning direction (a direction perpendicular to the drawing sheet of FIG. 2). The light source 11 emits light toward the contact glass CG. The light directed toward the contact glass CG is transmitted by the contact glass CG. With the document D set on the contact glass CG, the light transmitted by the contact glass CG is reflected by the document D.

The image sensor 12 has a plurality of photoelectric conversion elements arrayed in lines along the main scanning direction. The image sensor 12 receives light from the contact glass CG. With the document D set on the contact glass CG, light reflected by the document D travels toward the image sensor 12. The image sensor 12, upon receiving the light from the contact glass CG, performs photoelectric conversion for pixel by pixel on a line-unit basis to accumulate electric charges, outputting a signal responsive to the accumulated charges.

The mirrors 13 reflect the light from the contact glass CG toward the lens 14. The lens 14 condenses the light reflected by the mirrors 13, leading the light to the image sensor 12.

The light source 11 and the mirrors 13 are placed in a movable frame 15 which is movable along a sub scanning direction orthogonal to the main scanning direction. The movable frame 15 is coupled to a wire 16. The wire 16 is wound around a take-up drum 17. As the take-up drum 17 rotates, the movable frame 15 moves in the sub scanning direction. That is, the light source 11 and the mirrors 13 move in the sub scanning direction.

In a job involving the scanning of the document D, the movable frame 15 moves along the sub scanning direction (a direction from left to right as viewed from the front). While the movable frame 15 is moving in the sub scanning direction, the light source 11 emits light toward the contact glass CG. Also, the image sensor 12 repeatedly performs the photoelectric conversion of reflected light reflected by the document D. As a result, the scanning of the document D is fulfilled in the unit of each line.

As shown in FIG. 3, a document cover 101 is attached to the housing 10. The document cover 101 is opened and closed against a top surface of the housing 10 (a top surface of the contact glass CG). In order to make the document cover 101 openable and closable, a rotating shaft 10a is provided on a back face side of the housing 10. The document cover 101 is pivotably held on the rotating shaft 10a of the housing 10. In FIG. 3, an upper view shows a closed state of the document cover 101, and a lower view shows an opened state of the document cover 101.

Opening and closing of the document cover 101 is performed by the user. Normally, when the image forming apparatus 100 is made to execute a job involving the scanning of the document D, the user performs the work of opening and closing the document cover 101 to set the document D on the contact glass CG. That is, the user performs the work process of opening the document cover 101, then setting the document D on the contact glass CG and subsequently closing the document cover 101. Then, with the document cover 101 closed, the scanning of the document D set on the contact glass CG is carried out.

In this connection, in a job involving the scanning of the document D, a book or other book-type document BD may be set on the contact glass CG. Opening the book-type document BD and setting the same on the contact glass CG results in a state as shown in FIG. 4. Therefore, in a case where the scanning object is a double-page spread of the book-type document BD, the document cover 101 cannot be closed (see lower view of FIG. 3). Accordingly, the scanning of a double-page spread of the book-type document BD is carried out as the document cover 101 remains opened.

Reverting to FIG. 1, the printing section 2 includes a sheet conveyance path 20 (indicated by broken-line arrow in FIG. 1), as well as a plurality of conveyance roller pairs 21 for conveying a paper sheet P along the sheet conveyance path 20. The printing section 2 also includes sheet feed parts 22, an image forming part 23, and a fixing part 24.

The sheet feed part 22 feeds a sheet P contained in a sheet cassette C onto the sheet conveyance path 20. The sheet P fed onto the sheet conveyance path 20 is conveyed toward a transfer nip.

The image forming part 23 includes a photosensitive drum 231 and a transfer roller 232. Although not shown, the image forming part 23 further includes a charging unit for electrically charging a circumferential surface of the photosensitive drum 231, an exposure unit for forming an electrostatic latent image on the circumferential surface of the photosensitive drum 231, a developing unit for developing an electrostatic latent image on the circumferential surface of the photosensitive drum 231 into a toner image, and the like. The photosensitive drum 231 and the transfer roller 232 are in pressure contact with each other to form a transfer nip. The image forming part 23 transfers a toner image onto a sheet P passing through the transfer nip, and conveys the sheet P toward a fixing nip.

The fixing part 24 includes a heating roller 241 and a pressure roller 242. The heating roller 241 has a built-in heater. The pressure roller 242 is put into pressure contact with the heating roller 241 to form a fixing nip against the heating roller 241. The fixing part 24 heats and pressurizes a sheet P passing through the fixing nip to fix a toner image onto the sheet P, and conveys the sheet P toward a discharge tray ET.

The operation panel 3 includes a touch screen 31 and hardware buttons 32. The touch screen 31 displays a setting screen in which software buttons are arranged, and accepts various types of settings from the user. The hardware buttons 32 are provided in plurality on the operation panel 3. The hardware buttons 32 include a start button for accepting a job start instruction from the user, a stop button for accepting a job end instruction from the user, and the like.

Figure 5:
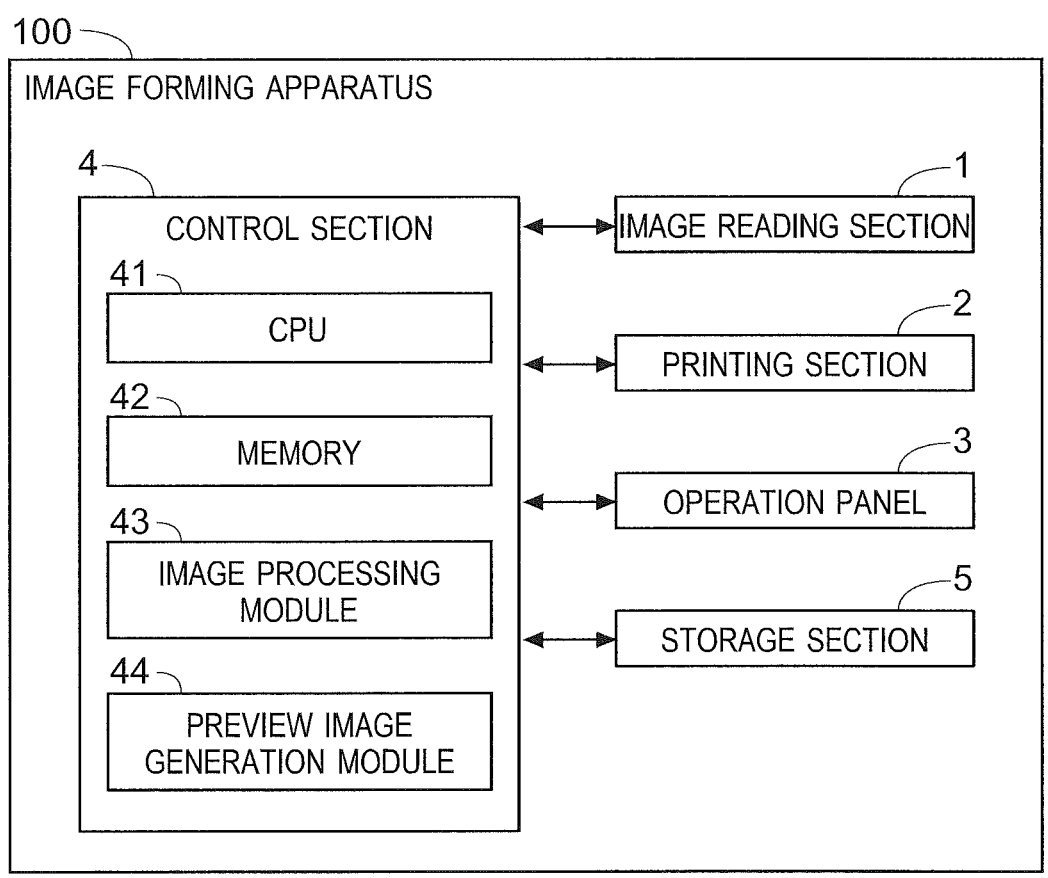
FIG. 5 is a block diagram showing a configuration of the image forming apparatus according to one embodiment of the disclosure.

As shown in FIG. 5, the image forming apparatus 100 further includes a control section 4. The control section 4 includes a CPU 41, memory 42, an image processing module 43, and a preview image generation module 44. The CPU 41 operates on a basis of control-dedicated programs and data to perform processing for controlling individual parts of the image forming apparatus 100. The memory 42 stores therein control-dedicated programs and data for operating the CPU 41.

The image processing module 43 includes exclusive circuits and memory for implementing various types of image processing. The control section 4 performs image processing by using the image processing module 43. For example, the control section 4 performs image processing for image data derived from scanning by the image reading section 1 to generate pre-output pages in each of which image data already subjected to image processing are provided. Then, the control section 4 generates page data (e.g., PDF data) for outputting the pre-output pages.

The preview image generation module 44 includes exclusive circuits and memory to implement preview processing for generating preview images (display data for preview use). The control section 4 performs the preview processing by using the preview image generation module 44. For example, preview images for previewing pre-output pages are generated by the control section 4.

The image reading section 1 is connected to the control section 4. The control section 4 controls light on/off operation of the light source 11 and scanning operation of the image sensor 12. The control section 4 also controls drive of a take-up motor (not shown) for rotating the take-up drum 17. The control section 4 switches between rotation and rotational stop of the take-up drum 17 to move the movable frame 15, on which the light source 11 and the mirrors 13 are set up, properly in the sub scanning direction.

The printing section 2 is connected to the control section 4. The control section 4 controls sheet feed operation of the sheet feed part 22, image forming operation of the image forming part 23, and fixing operation of the fixing part 24.

The operation panel 3 is connected to the control section 4. The control section 4 controls display operation of the touch screen 31. Also, the control section 4 detects a touch operation made on the touch screen 31 (software buttons), and detects a depressing operation made on the hardware buttons 32.

The image forming apparatus 100 further includes a storage section 5. The storage section 5 includes nonvolatile memory devices such as HDD and ROM (e.g., EEPROM). The storage section 5 is connected to the control section 4. The control section 4 performs writing of data onto the storage section 5 and reading of data from the storage section 5. In addition, a saving area called custom box is provided in the storage section 5. In the custom box of the storage section 5, pre-output pages (PDF data) obtained by execution of a later-described book scan job are saved.

<Book Scan Job>

(Settings for Book Scan Job)

Figure 6:
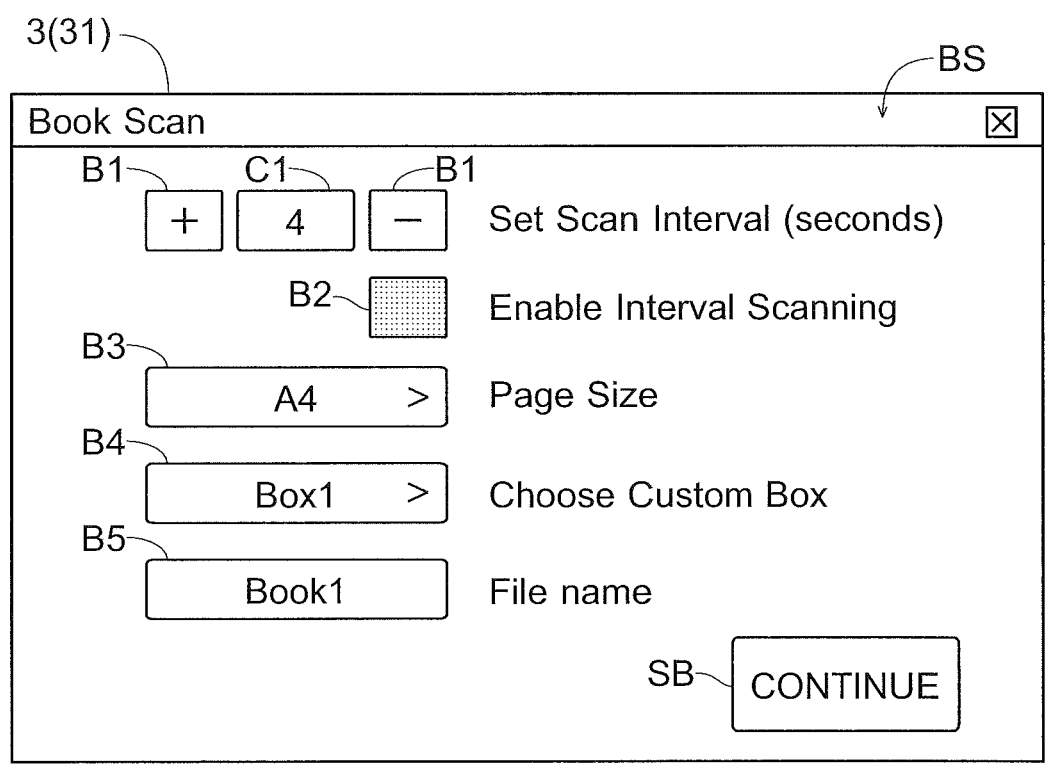
FIG. 6 is a view showing a book scan screen to be displayed on an operation panel in the image forming apparatus according to one embodiment of the disclosure.

The image forming apparatus 100 is equipped with a book scan function. An instruction for using the book scan function is to be accepted by the operation panel 3. For example, although not shown, the operation panel 3 displays a home screen in which book scan buttons (software buttons) are arranged. Upon detecting an operation on the book scan buttons, the control section 4 makes such a book scan screen BS as shown in FIG. 6 displayed on the operation panel 3.

The book scan screen BS is a screen for accepting, from a user, settings for a job corresponding to the book scan function (hereinafter, referred to as book scan job).

Scan interval setting buttons B1 are provided in the book scan screen BS. The scan interval setting buttons B1 are software buttons for accepting, from the user, a setting of a scan interval (a time elapsing from completion of the N-th scan until start of the (N+1)-th scan) for the image reading section 1 in execution of the book scan job, where a plus button and a minus button are included therein. Operating the scan interval setting buttons B1 allows the scan interval for the image reading section 1 to be set arbitrarily.

Operating the plus button as a scan interval setting button B1 causes the scan interval for the image reading section 1 to be elongated. Operating the minus button as a scan interval setting button B1 causes the scan interval for the image reading section 1 to be shortened. A scan interval set (inputted) by operations on the scan interval setting buttons B1 is displayed in a display field C1. FIG. 6 shows a case in which the scan interval for the image reading section 1 is set to 4 seconds.

An enable/disable setting button B2 is also provided in the book scan screen BS. The enable/disable setting button B2 is a software button for accepting an enable/disable setting of an interval scanning mode from the user. Operating the enable/disable setting button B2 to set the interval scanning mode enabled causes scanning by the image reading section 1 to be repeated at the scan interval of the user's designation in execution of a book scan job. Operating the enable/disable setting button B2 under a condition that the interval scanning mode has been set enabled allows the interval scanning mode to be set disabled. Depending on whether the interval scanning mode has been set enabled or disabled, for example, the enable/disable setting button B2 changes in display form (display color etc.).

A page size setting button B3 is also provided in the book scan screen BS. The page size setting button B3 is a software button for accepting, from the user, a page size setting for pre-output pages obtained by execution of a book scan job. Operating the page size setting button B3 causes a page size setting screen (not shown) for setting the page size of pre-output pages to be displayed on the operation panel 3. Upon completion of the setting on the page size setting screen, the display screen of the operation panel 3 returns to the book scan screen BS. In this aspect, a text indicative of a page size set in the page size setting screen is displayed in a display area of the page size setting button B3. In the case of FIG. 6, the page size of a pre-output page is set to A4 size.

A box setting button B4 is also provided in the book scan screen BS. The box setting button B4 is a software button for accepting, from the user, a setting of a saving destination (custom box) for page data of pre-output pages obtained by execution of a book scan job. Operating the box setting button B4 causes a box setting screen (not shown) for setting a saving destination to be displayed on the operation panel 3. Upon completion of the setting on the box setting screen, the display screen of the operation panel 3 returns to the book scan screen BS. In this aspect, a text indicative of a saving destination set on the box setting screen is displayed in a display area of the box setting button B4. In the case of FIG. 6, a custom box named 'Box1' is set as the saving destination.

A file name setting button B5 is also provided in the book scan screen BS. The file name setting button B5 is a software button for accepting, from the user, a setting of a file name for page data of pre-output pages obtained by execution of a book scan job. Operating the file name setting button B5 causes a file name setting screen (not shown) for setting a file name for page data of pre-output pages to be displayed on the operation panel 3. Upon completion of the setting on the file name setting screen, the display screen of the operation panel 3 returns to the book scan screen BS. In this aspect, a text indicative of a file name set on the file name setting screen is displayed in a display area of the file name setting button B5. In the case of FIG. 6, the file name is set to 'Book1.'

A start button SB is also provided in the book scan screen BS. As an example, a text 'CONTINUE' is written in a display area of the start button SB. The start button SB is a software button for accepting a start instruction for a book scan job from the user. That is, at the time when the user operates the start button SB, a book-type document BD has been set on the contact glass CG.

(Execution of Book Scan Job)

Upon detecting that the operation panel 3 has accepted a start instruction (an operation on the start button SB) for a book scan job, the control section 4 recognizes a setting content of the enable/disable setting for the interval scanning mode. Given that the interval scanning mode is set enabled, the control section 4 further recognizes a scan interval of the user's designation inputted to the display field C1.

With the interval scanning mode enabled, the control section 4 instructs the image reading section 1 to scan double-page spreads of the book-type document BD continually at scan intervals of the user's designation. As a result of this, for the user, who intends to make the image forming apparatus 100 scan a plurality of double-page spreads of the book-type document BD, it becomes the only necessity to repeat document setting work of turning over a page of the book-type document BD and setting the book-type document BD on the contact glass CG (it is no longer necessary to make operations on the operation panel 3 after the first operation made on the start button SB of the book scan screen BS). Thus, higher convenience results. However, after scanning of a double-page spread of the book-type document BD is completed and before a scan interval of the user's designation elapses, the book-type document BD needs to be turned over in page and reset onto the contact glass CG.

With the interval scanning mode disabled, the control section 4 instructs the image reading section 1 to scan a double-page spread of the book-type document BD only once, temporarily halting the book scan job. Then, the control section 4 decides whether or not any operation on the start button SB of the book scan screen BS has been made again. When an operation is made once again on the start button SB, the control section 4 detects the redone operation as a resumption instruction for the book scan job, and instructs the image reading section 1 to redo only once the scanning of a double-page spread of the book-type document BD (resume the book scan job). That is, after the starting of a book scan job, the control section 4 halts the book scan job each time scanning by the image reading section 1 is once ended, and after the halting of the book scan job, resumes the book scan job upon receiving a resumption instruction for the book scan job. As a result of this, the user is allowed to carry out the document setting work at the user's own pace.

The control section 4 decides whether or not the operation panel 3 has accepted an end instruction for the book scan job from the user after a start of a book scan job. For example, the operation panel 3 accepts, as the end instruction, an operation on the stop button provided as a hardware button. In addition, with the interval scanning mode enabled, a re-operation on the start button SB of the book scan screen BS may be accepted as an end instruction.

When deciding that an end instruction for the book scan job has been accepted, the control section 4 terminates the book scan job. Then, the control section 4 bundles, into one file, page data of pre-output pages corresponding to image data obtained by one batch of the book scan job, storing the resulting file into the storage section 5. In this process, the file is stored in the custom box of the user's designation (a custom box set in the box setting screen). Also, a file name of the user's designation (a file name set in the file name setting screen) is given to the file.

Anytime after the page data of pre-output pages has been stored in the custom box of the storage section 5, the pre-output pages can be printed out on sheets P. Also, with a user terminal (e.g., personal computer) connected to the image forming apparatus 100, the page data of the pre-output pages can be transmitted from the image forming apparatus 100 to the user terminal.

Figure 7:
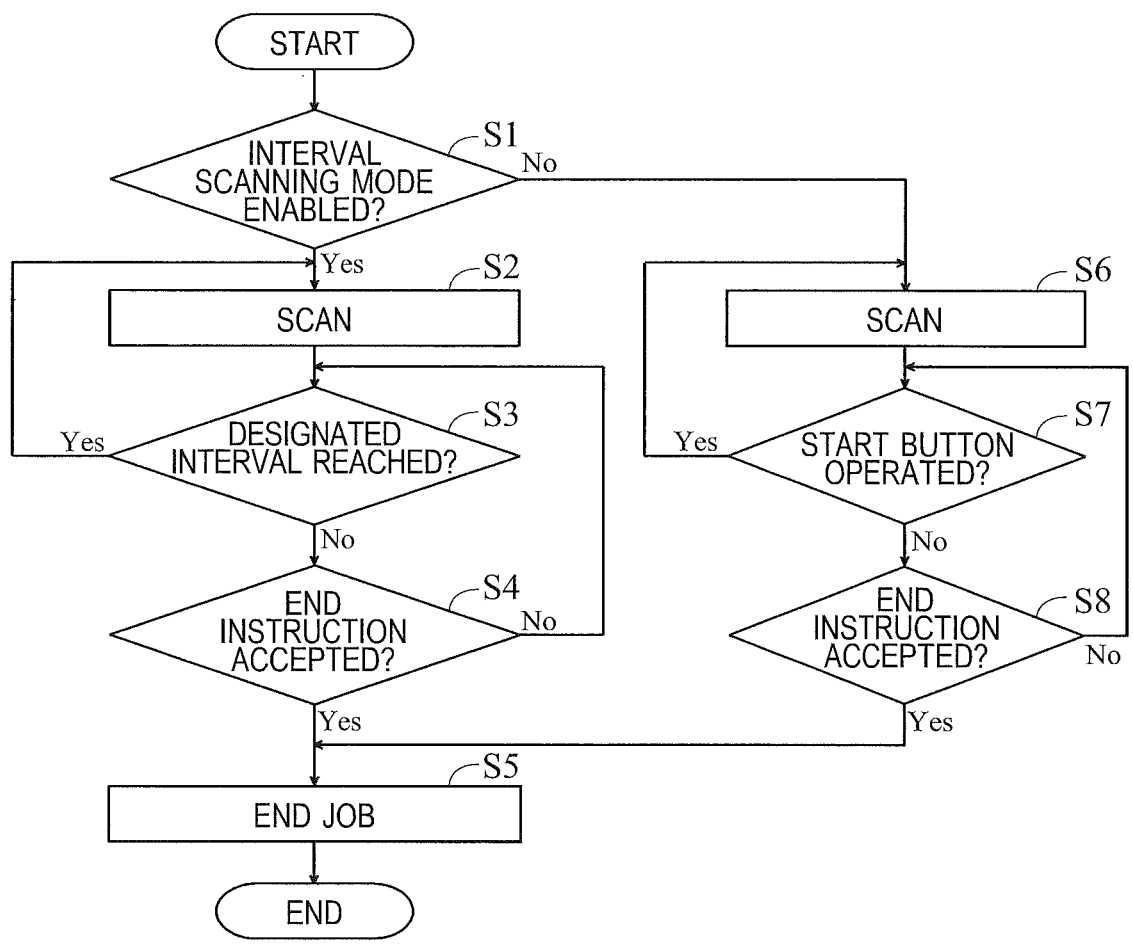
FIG. 7 is a flowchart for explaining a flow of processing that a control section of the image forming apparatus according to one embodiment of the disclosure performs after a start of a book scan job.

Hereinbelow, a flow of processing that the control section 4 executes after a start of a book scan job will be described with reference to a flowchart shown in FIG. 7. The flowchart of FIG. 7 gets started when the control section 4 detects that the start button SB of the book scan screen BS has been operated.

At step S1, the control section 4 decides whether or not the interval scanning mode has been set enabled. As a result, when the control section 4 decides that the interval scanning mode has been set enabled, the processing flow moves on to step S2.

Upon transition to step S2, the control section 4 instructs the image reading section 1 to make a one-time scan. Then, at step S3, the control section 4 decides whether or not an elapsed time since completion of the one-time scan by the image reading section 1 has reached a scan interval (designated interval) of the user's designation. As a result, when the control section 4 decides that the elapsed time has reached the designated interval, the processing flow moves on to step S2. Otherwise, when the control section 4 decides that the elapsed time has not yet reached the designated time, the processing flow moves on to step S4.

Upon transition to step S4, the control section 4 decides whether or not the operation panel 3 has accepted an end instruction. As a result, when the control section 4 decides that the end instruction has been accepted, the processing flow moves on to step S5; otherwise, when the control section 4 decides that the end instruction has not yet been accepted, the processing flow moves on to step S3. Upon transition to step S5, the control section 4 terminates the book scan job.

In a case where the control section 4 decides at step S1 that the interval scanning mode has not been set enabled (has been set disabled), the processing flow moves on to step S6.

Upon transition to step S6, the control section 4 instructs the image reading section 1 to make a one-time scan. Then, at step S7, upon completion of the one-time scan by the image reading section 1, the control section 4 decides whether or not an operation on the start button SB of the book scan screen BS has been made once again. As a result, when the control section 4 decides that an operation on the start button SB has been made again, the processing flow moves on to step S6. Otherwise, when the control section 4 decides that no operation on the start button SB has been made again, the processing flow moves on to step S8.

Upon transition to step S8, the control section 4 decides whether or not the operation panel 3 has accepted an end instruction. As a result, when the control section 4 decides that an end instruction has been accepted, the processing flow moves on to step S5. Otherwise, when the control section 4 decides that no end instruction has been accepted, the processing flow moves on to step S7.

(Generation of Pre-Output Pages)

The control section 4 acquires, as a processing object, image data obtained by scanning by the image reading section 1, and based on the acquired processing-object image data, generates pre-output pages corresponding to a double-page spread of the book-type document BD. As part of the page generation process for generating pre-output pages corresponding to a double-page spread of the book-type document BD, the control section 4 performs a cutting process and a dividing process. As a result, a first pre-output page corresponding to one page of the double-page spread and a second pre-output page corresponding to the other page of the double-page spread are generated as pre-output pages (two pages of pre-output pages are generated). To fulfill the cutting process and the dividing process, the control section 4 performs a cutting area setting process and a borderline setting process.

First, the cutting area setting process is described below with reference to FIG. 8. Hereinbelow, it is assumed that image data shown in FIG. 8 has been acquired as a processing object.

Figure 8:
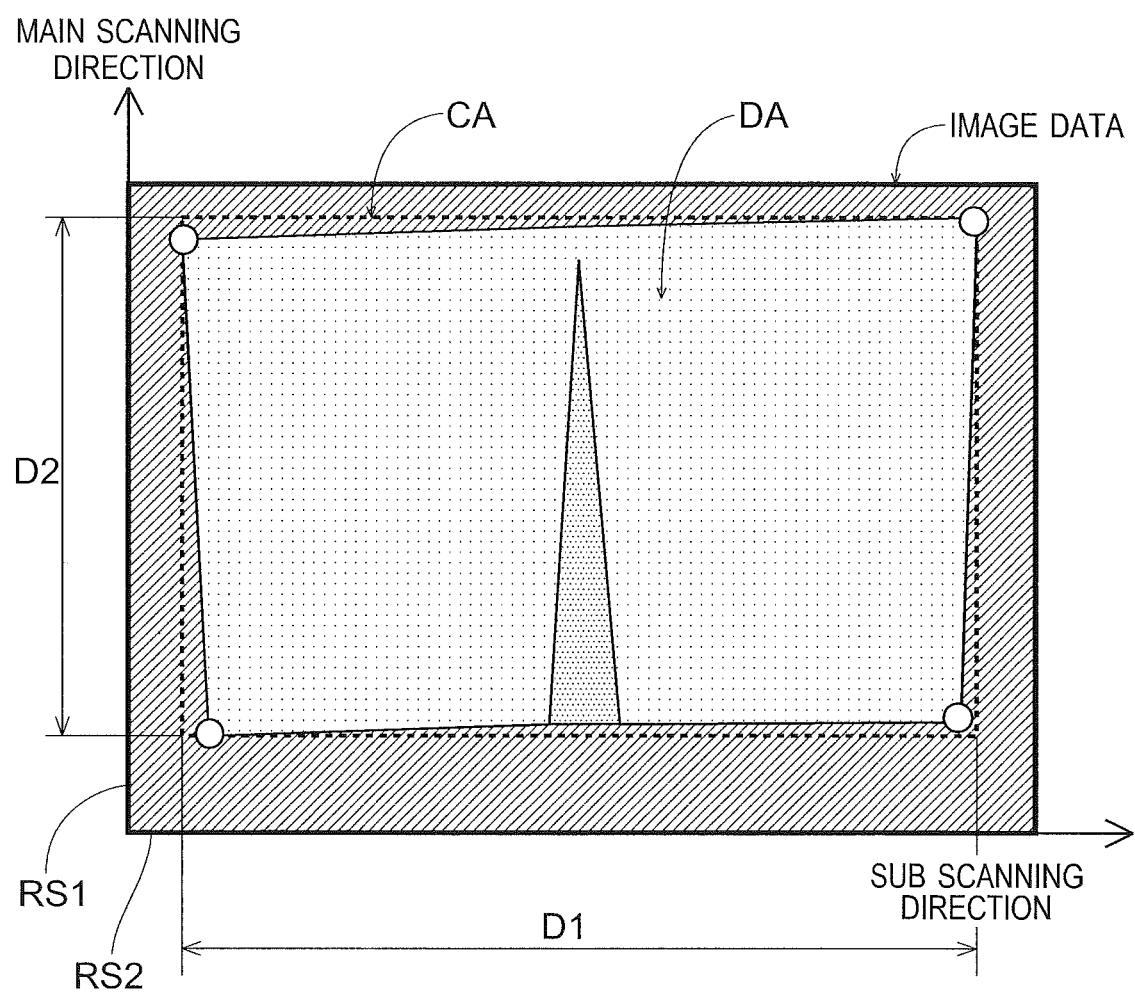
FIG. 8 is a view for explaining a cutting area setting process to be performed by the control section in the image forming apparatus according to one embodiment of the disclosure.

Having acquired the processing-object image data, the control section 4 detects, from the processing-object image data, a document area DA in which an image of a double-page spread of the book-type document BD is present as shown in FIG. 8. In this case, for the purpose of detecting the document area DA, the control section 4 performs, for example, an edge detection process for the processing-object image data. Then, the control section 4 sets, as a cutting area CA, an area containing the entire document area DA out of the processing-object image data. In this case, the cutting area CA is an area of a quadrangular shape (rectangular shape whose interior angles are all right-angled) having two pairs of opposite sides, one pair parallel to the main scanning direction and the other pair parallel to the sub scanning direction. In FIG. 8, the document area DA is indicated by dot pattern, and the cutting area CA is indicated by broken line. Also, the four sides of the processing-object image data are indicated by thick line, and a non-document area (area other than the document area DA) in the processing-object image data is hatched. This is the case also with FIG. 10 referred to in the following description.

Figure 9:
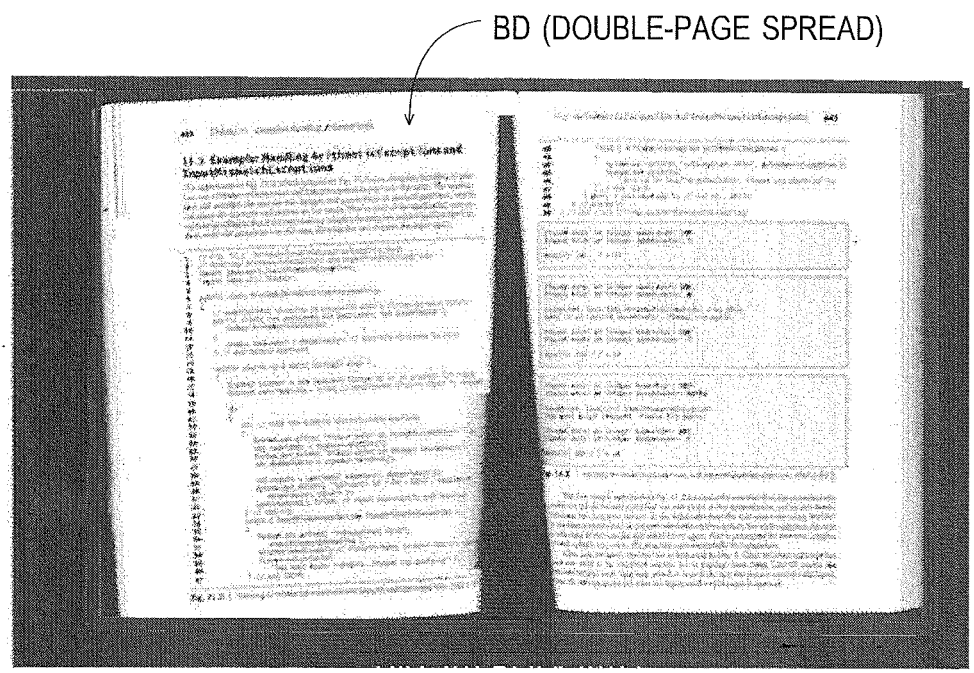
FIG. 9 is a view showing a state of a book-type document set to the image reading section in the image forming apparatus according to one embodiment of the disclosure.

When the user opens the book-type document BD and sets the document onto the contact glass CG (see FIG. 4), the user tries to prevent a cover page from being inclined as viewed in a planar view. However, even when the cover page of the book-type document BD is not inclined, part of the double-page spread of the book-type document BD is inclined as shown in FIG. 9 (FIG. 9 shows a case in which the book-type document BD set on the contact glass CG is viewed from below). In this case, the document area DA is inclined as in the case shown in FIG. 8.

Also, depending on the binding style of the book-type document BD, it may be difficult to put a stitch portion (including its neighborhood) of a double-page spread of the book-type document BD into close contact with the contact glass CG. In this case, as in the example shown in FIG. 8, there emerges, within the document area DA, a black image area (which is narrower in dot pitch than the other areas) that arises due to a gap between the stitch portion of the double-page spread of the book-type document BD and the contact glass CG.

Since the document area DA present in the processing-object image data is all cut out from the processing-object image data, the control section 4 sets an area larger than the document area DA as the cutting area CA. More specifically, the control section 4 executes a corner detection process of detecting four corners of the document area DA. In FIG. 8, four corners detected by the corner detection process by the control section 4 are marked with hollow circles, respectively. Although not particularly limited, the Harris corner detection method may be used to detect the four corners of the document area DA.

The control section 4 sets, as a first reference side RS1, one of the sides parallel to the main scanning direction out of the four sides of the processing-object image data, and also sets, as a second reference side RS2, one of the sides parallel to the sub scanning direction. Further, with respect to an orthogonal coordinate system whose Y axis is given by the first reference side RS1 and whose X axis is given by the second reference side RS2, the control section 4 recognizes positions (coordinates) of the four corners of the document area DA present in the processing-object image data.

Thereafter, the control section 4 determines, as a first distance D1, a sub-scanning-direction distance between a position of the corner nearest to the first reference side RS1 and a position of the corner farthest from the first reference side RS1 out of the four corners of the document area DA, and moreover determines, as a second distance D2, a distance between a position of the corner nearest to the second reference side RS2 and a position of the corner farthest from the second reference side RS2 out of the four corners of the document area DA. Then, the control section 4 sets, as the cutting area CA, a quadrangular area which contains the entire document area DA and moreover in which a distance between opposite sides parallel to the main scanning direction equals the first distance D1 and a distance between opposite sides parallel to the sub scanning direction equals the second distance D2.

By execution of such a cutting area setting process by the control section 4, an area containing the entire document area DA out of the processing-object image data can be set as the cutting area CA. That is, the document area DA is kept from stretching outside the cutting area CA.

Next, the borderline setting process is described below with reference to FIG. 10. In this connection, in a book scan job, one of the main scanning direction and the sub scanning direction is set as a page array direction. Further, it is predetermined that the book-type document BD is to be set on the contact glass CG in such a way that one page and the other page of a double-page spread of the book-type document BD are arrayed in the page array direction. For example, a guidance indicating the way of setting the book-type document BD (page array direction) may appropriately be displayed on the operation panel 3 when an operation is made on the book scan buttons in the home screen.

Hereinbelow, it is assumed that the page array direction is the sub scanning direction. In this case, in setting the book-type document BD onto the contact glass CG, the user takes care so that one page and the other page of a double-page spread are arrayed in the sub scanning direction. In addition, the page array direction may also be arbitrarily settable for the user. This setting is to be accepted by the operation panel 3.

Figure 10:
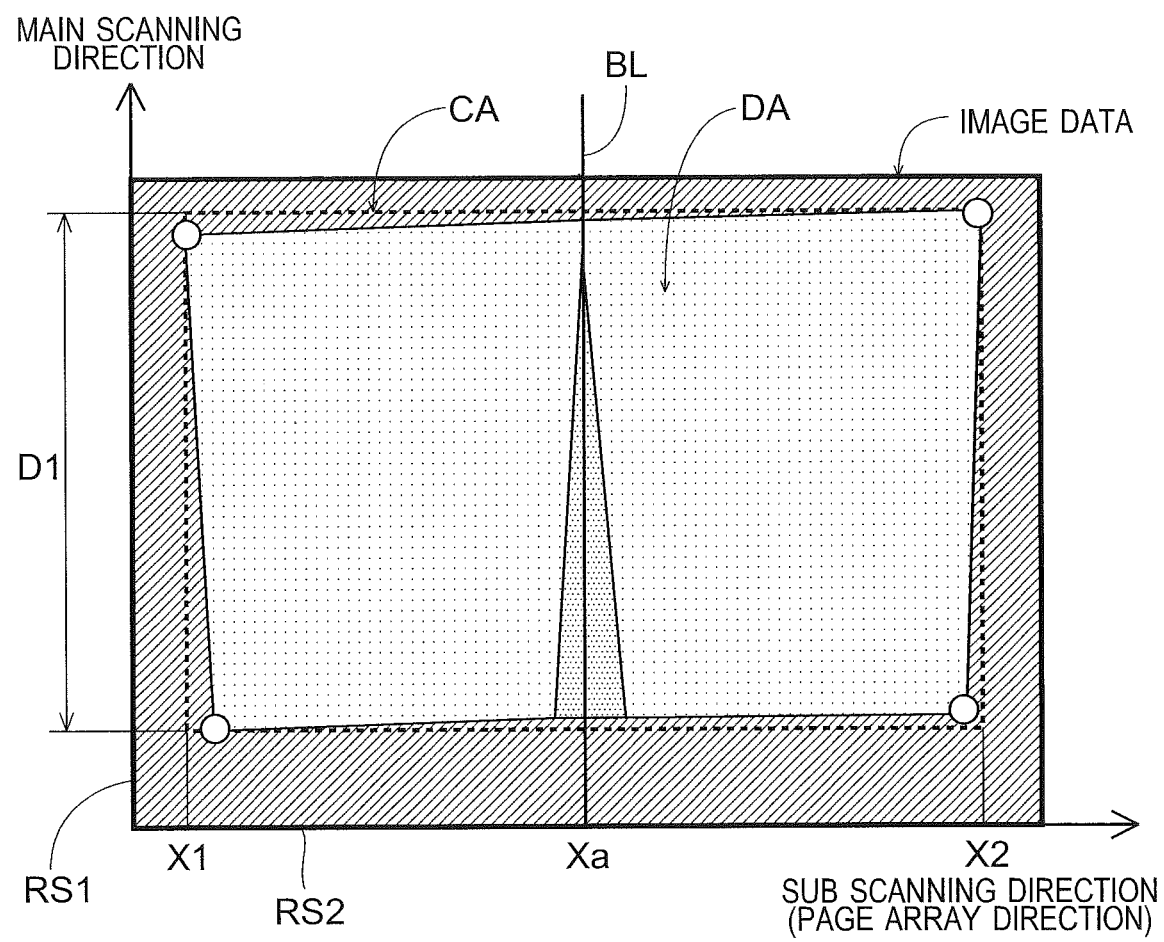
FIG. 10 is a view for explaining a borderline setting process to be performed by the control section in the image forming apparatus according to one embodiment of the disclosure.

Upon completion of the cutting area setting process, as shown in FIG. 10, the control section 4 sets, as a borderline BL, a line which passes through a page-array-direction (sub-scanning-direction) center position of the cutting area CA set by the cutting area setting process in such a direction (main scanning direction) as to orthogonally intersect the page array direction. In other words, the control section 4 sets a borderline BL which divides an area corresponding to one page of a double-page spread out of the processing-object image data and an area corresponding to the other page of the double-page spread from each other.

More specifically, with respect to the orthogonal coordinate system whose Y axis is given by the first reference side RS1 and whose X axis is given by the second reference side RS2, the control section 4 recognizes an X-axis-direction (sub-scanning-direction) coordinate value X1 of the corner nearest to the first reference side RS1 as well as an X-axis-direction (sub-scanning-direction) coordinate value X2 of the corner farthest from the first reference side RS1 out of the four corners of the cutting area CA set by the cutting area setting process. Then, the control section 4 determines a coordinate value Xa equal to one half of a value resulting from subtracting the coordinate value X1 from the coordinate value X2, and sets, as the borderline BL, a line that passes through the coordinate value Xa in the Y-axis direction (main scanning direction).

By execution of such a borderline setting process by the control section 4, the borderline BL can be set generally at a border between an area containing the image of one page of a double-page spread present in the cutting area CA and another area containing the image of the other page of the double-page spread.

Figure 11:
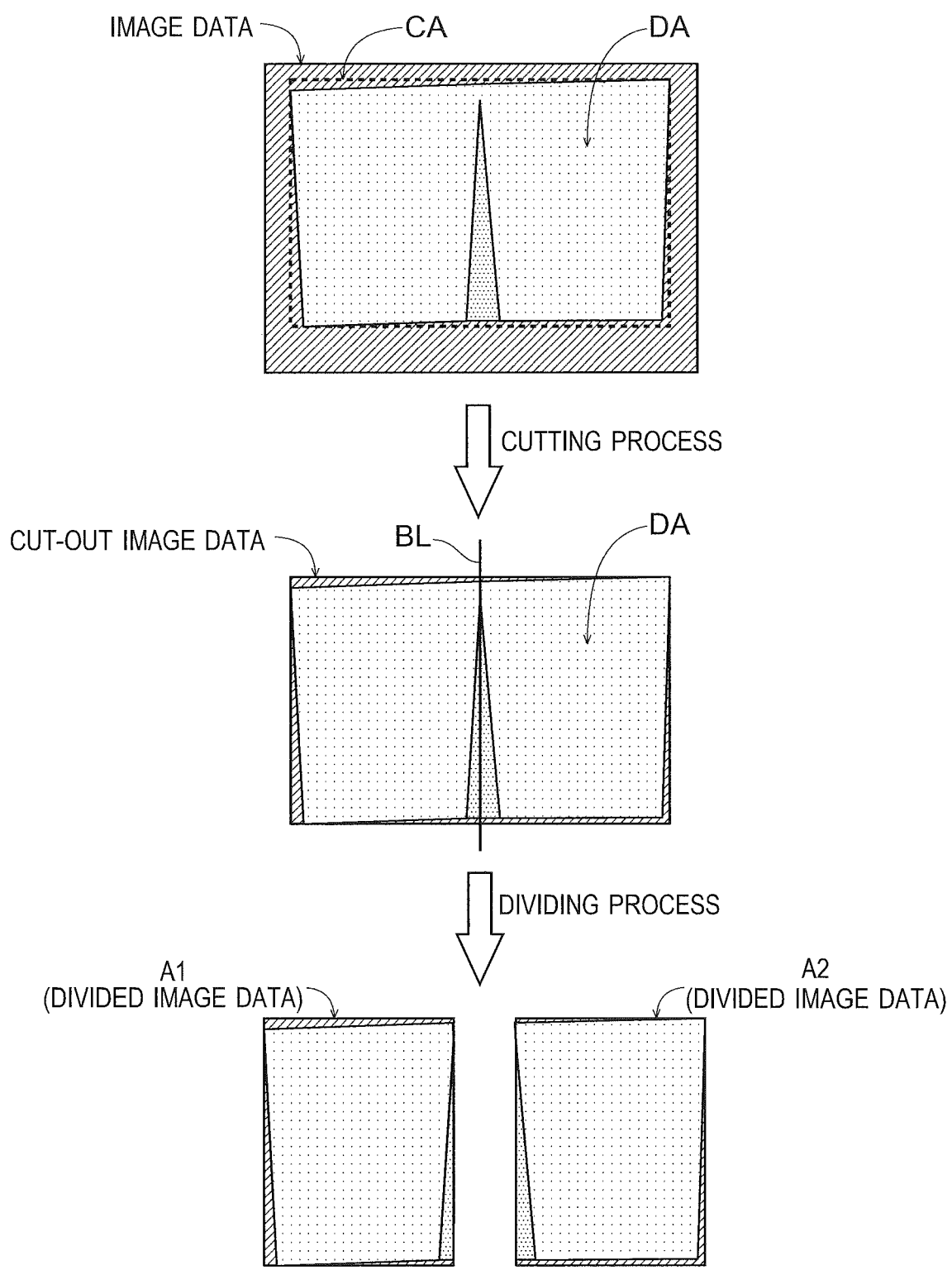
FIG. 11 is a view for explaining divided image data which are obtained by a cutting process and a dividing process to be performed by the control section in the image forming apparatus according to one embodiment of the disclosure.

After the setting of each of the cutting area CA and the borderline BL, the control section 4 executes the cutting process to cut out the cutting area CA from the processing-object image data, as shown in FIG. 11 (see uppermost view and middle view of FIG. 11). The control section 4 also executes the dividing process to divide image data of the cutting area CA (cut image data), which has been cut out from the processing-object image data, into a one-side area A1 of the borderline BL and the other-side area A2 of the borderline BL (i.e., to divide the cutting area CA along the borderline BL).

Figure 12:
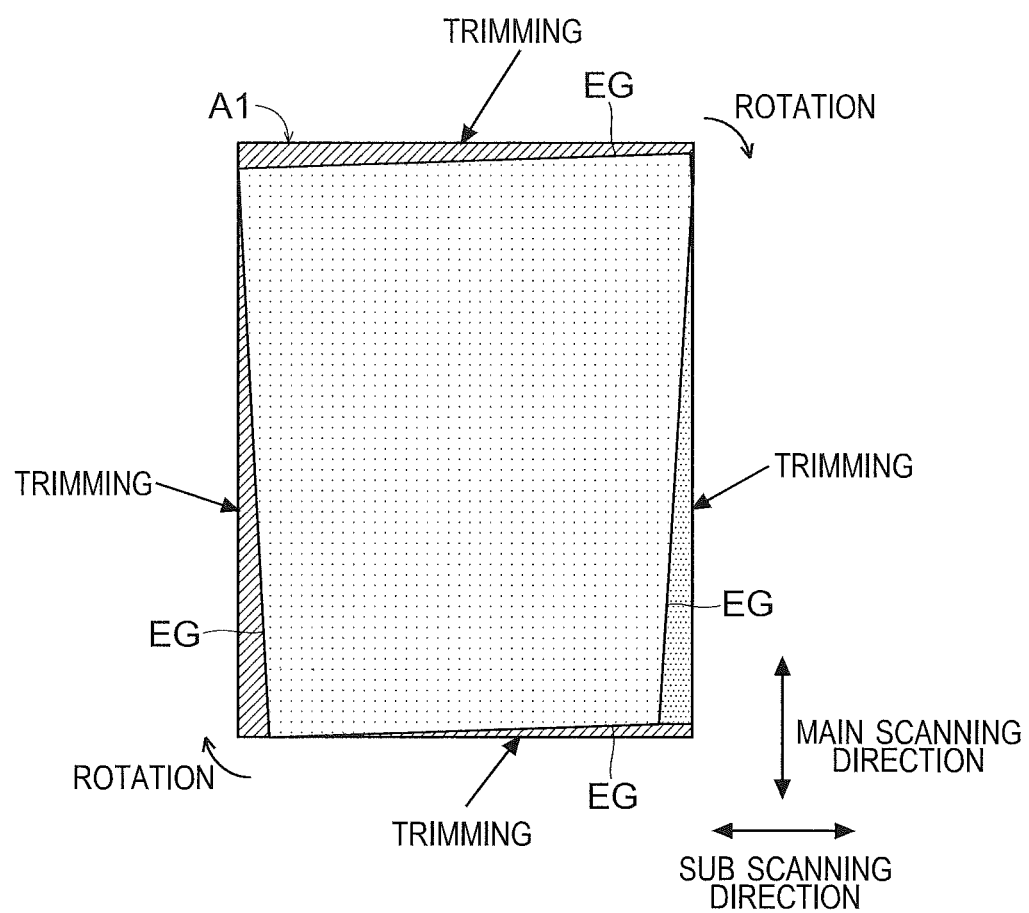
FIG. 12 is a view for explaining image processing (trimming process and rotation process) that the control section of the image forming apparatus according to one embodiment of the disclosure performs for divided image data.

Thereafter, the control section 4 performs predetermined various types of image processing for each data block of the divided image data, the one-side area A1 and the other-side area A2 (i.e., cut image data divided into two blocks by the dividing process). Hereinbelow, a case in which the divided image data of the one-side area A1 is subjected to image processing will be described below with reference to FIG. 12. However, it is noted that the divided image data of the other-side area A2 will be subjected to similar image processing.

The control section 4 executes the edge detection process for the divided image data to detect edge images EG corresponding to edges of a double-page spread of the book-type document BD from the divided image data. The control section 4 also recognizes inclination angles of a pair of edge images EG opposed to each other in the main scanning direction, the inclination angles being relative to the main scanning direction or the sub scanning direction. Then, the control section 4 executes the rotation process for the divided image data so that the divided image data is rotated until the pair of edge images EG opposed to each other in the main scanning direction become generally parallel to the sub scanning direction (generally perpendicular to the main scanning direction).

The control section 4 executes the trimming process for the divided image data. In this process, the control section 4 detects black image areas present in the divided image data (i.e., non-document areas are detected as black image areas).

In a case where a gap has occurred between the stitch portion of a double-page spread of the book-type document BD and the contact glass CG, an area corresponding to the gap is detected as a black image area. Then, the control section 4 trims outer edge areas (frame-shaped areas) containing at least the black image areas out of the divided image data.

Although not shown, the divided image data is further subjected to other processes for adjusting contrast and brightness of images, distortions of images, and the like.

Figure 13:
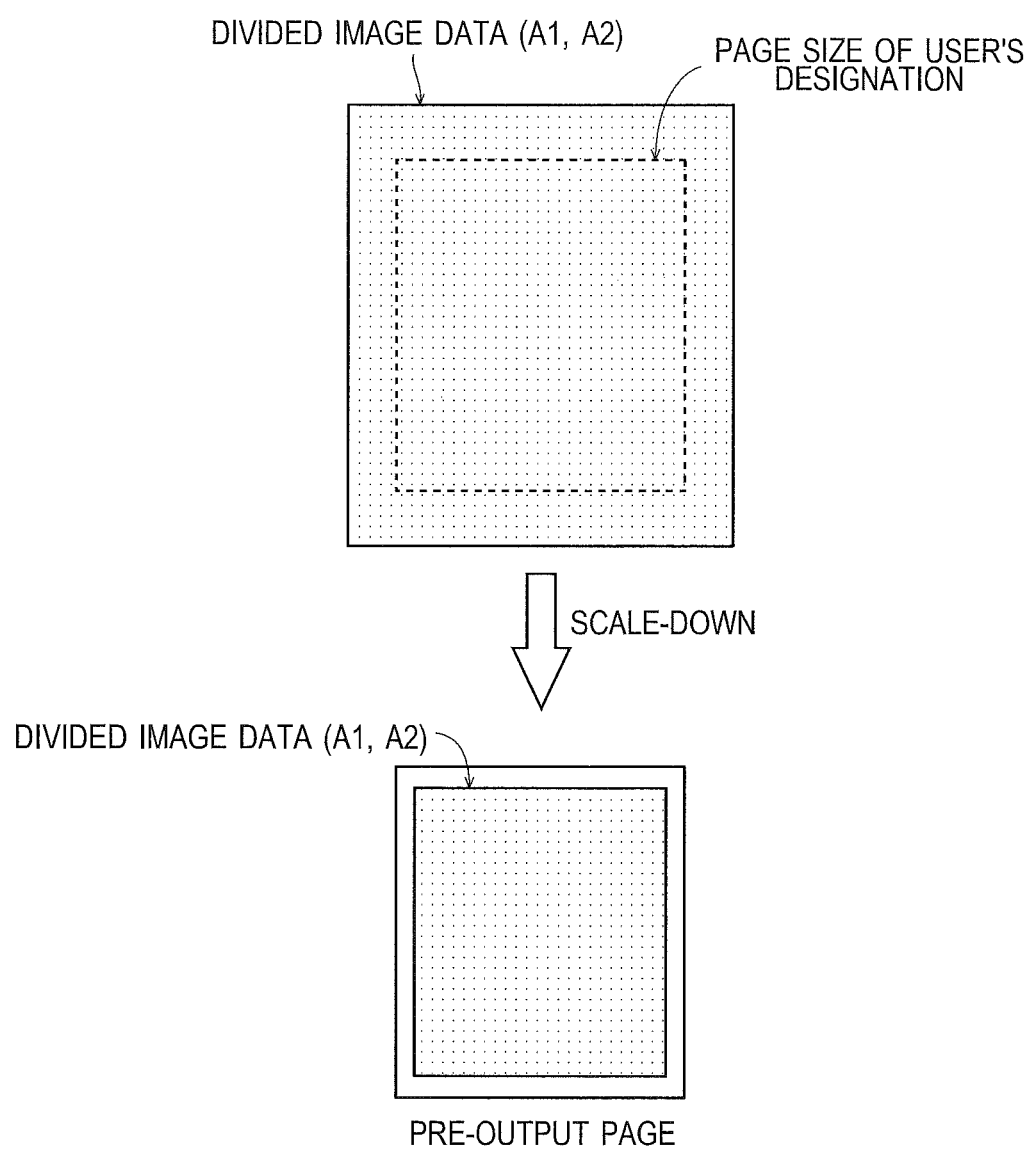
FIG. 13 is a view for explaining image processing (scale-down process) that the control section of the image forming apparatus according to one embodiment of the disclosure performs for divided image data.

After the divided image data of the one-side area A1 and the divided image data of the other-side area A2 have been subjected to various types of image processing, the control section 4, as shown in FIG. 13, generates a first pre-output page with the divided image data of the one-side area A1 provided therein as well as a second pre-output page with the divided image data of the other-side area A2 provided therein. In this process, the control section 4 recognizes a page size of the user's designation (a page size set in the page size setting screen), and scales down the divided image data so that the divided image data is fully contained within the page of the user's designation size.

In addition, without scaling down the divided image data, outer-edge areas of the divided image data may be trimmed so that the divided image data are fully contained in the page of the user's designation size. Moreover, given that the size of the divided image data is small for the page size of the user's designation, the divided image data may be scaled up.

In a case where the image reading section 1 has executed plural times of scans from the operation panel 3's acceptance of a start instruction for a book scan job until its acceptance of an end instruction for the book scan job, the control section 4 executes a page generation process (a process of generating pre-output pages) in a page generation mode, whichever it is a first mode or a second mode. In the first mode, the cutting area setting process and the borderline setting process are executed each once for one batch of the book scan job. In the second mode, the cutting area setting process and the borderline setting process are executed for each of plural chunks of image data obtained by one batch of the book scan job (the cutting area setting process and the borderline setting process are executed each plural times (to a number of times equal to that of scans)).

For example, it is predetermined by the user whether the page generation mode is set to the first mode or the second mode. This setting is to be accepted by the operation panel 3. The control section 4 executes the page generation process in a page generation mode of the user's designation.

In addition, the page generation process by the control section 4 is executed after an end of the book scan job. In the first mode, since the cutting area setting process and the borderline setting process are executed each only once, the user is enabled to promptly acquire pre-output pages after the end of the book scan job. In the second mode, since the cutting area setting process and the borderline setting process are executed each plural times, a time lapse from an end of the book scan job until completion of the generation of pre-output pages becomes longer than in the first mode.

However, in the second mode, since the cutting area setting process and the borderline setting process are executed for each of plural chunks of image data obtained by the book scan job, there can be suppressed occurrence of a disadvantage that the cutting area CA or the borderline BL may be shifted (less likely to occur are such disadvantages as one that the cutting area CA may be set at a position largely shifted from the document area DA, and another that the borderline BL may be set at a position largely shifted from a border between one area corresponding to one page of the document area DA and another area corresponding to the other page).

Figure 14:
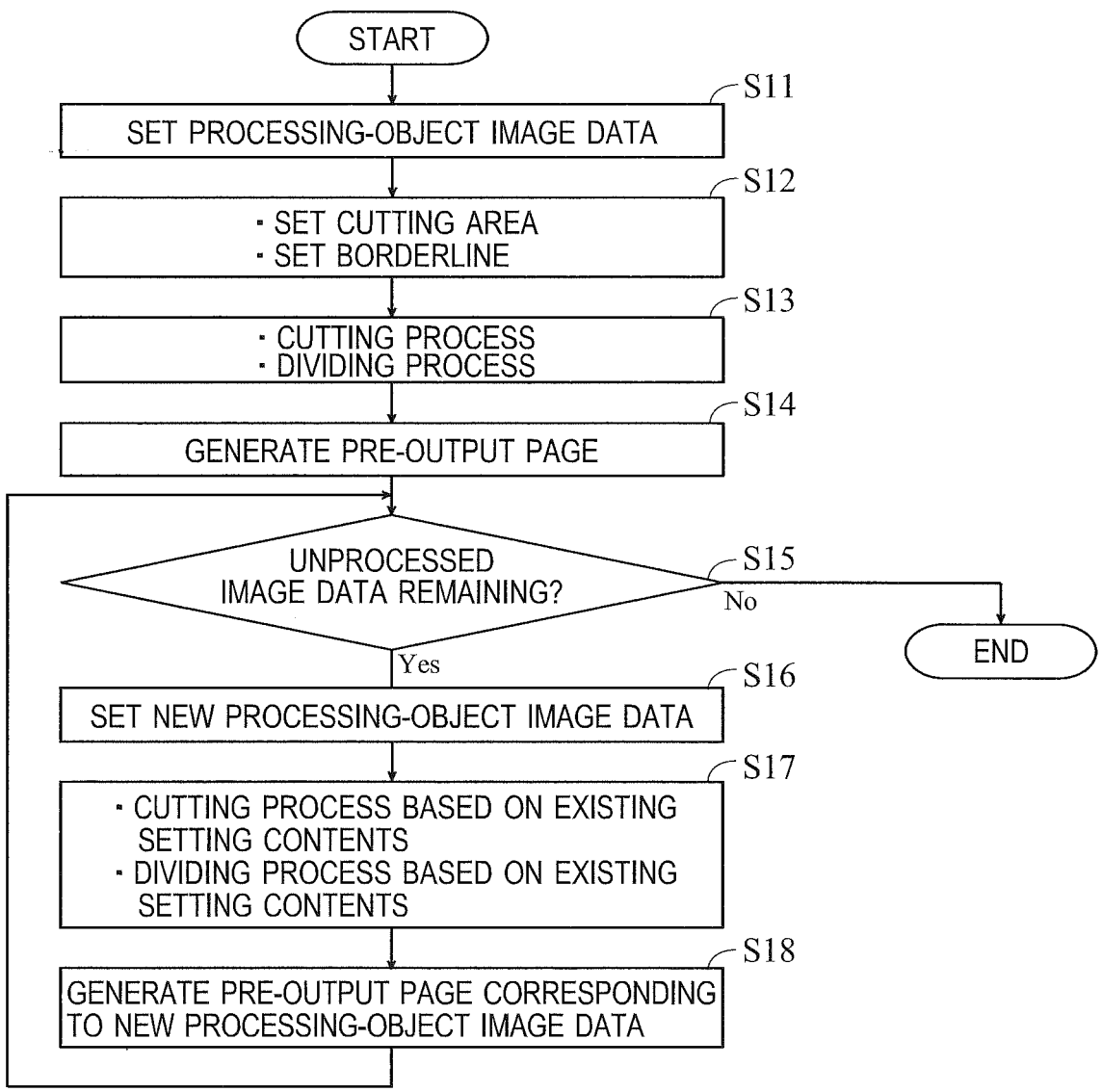
FIG. 14 is a flowchart for explaining a page generation process (first mode) to be performed by the control section in the image forming apparatus according to one embodiment of the disclosure.

With the page generation mode set to the first mode, the control section 4 executes the page generation process along a flowchart shown in FIG. 14. The flowchart of FIG. 14 gets started when the control section 4 decides that an end instruction for a book scan job has been accepted.

At step S11, the control section 4 sets, as a processing object, image data obtained by a scan of a specified ordinal-numbered time out of a plural number of scans made by the image reading section 1. For example, image data obtained by the first-time scan is set as the processing object. Then, at step S12, the control section 4 sets a cutting area CA and a borderline BL based on the processing-object image data.

At step S13, the control section 4 cuts out the cutting area CA from the processing-object image data, and divides the cut-out cutting area CA along the borderline BL (i.e., executes the cutting process and the dividing process). In this way, the control section 4 generates divided image data of the one-side area A1 and divided image data of the other-side area A2. The control section 4 further executes various types of image processing such as rotation process and trimming process for the individual divided image data of the one-side area A1 and the other-side area A2. Then, at step S14, the control section 4 generates, as pre-output pages (pre-output pages corresponding to the processing-object image data), a first pre-output page in which the divided image data of the one-side area A1 already subjected to image processing is provided and a second pre-output page in which the divided image data of the other-side area A2 already subjected to image processing is provided, respectively.

At step S15, the control section 4 decides whether or not there remains any unprocessed image data that has not yet been set as a processing object (image data whose corresponding pre-output page has not yet been generated). As a result, when the control section 4 decides that there remains unprocessed image data, the processing flow moves on to step S16; otherwise, when the control section 4 decides that there remains no unprocessed image data, this flow is ended.

Upon transition to step S16, the control section 4 sets any of unprocessed image data as a new processing object. With plural chunks of unprocessed image data remaining, for example, the earliest-scanned unprocessed image data out of the plural chunks of unprocessed image data is set as the new processing object.

At step S17, the control section 4 cuts out, from the new processing-object image data, an area positioned congruous with the cutting area CA set based on the image data obtained by a scan of the specified ordinal-numbered time (first time) scan, and then divides the cut-out area along a line positioned congruous with the borderline BL set based on the image data obtained by the scan of the specified ordinal-numbered time (i.e., executes the cutting process based on the existing setting contents and the dividing process based on the existing setting contents). Further, at step S18, the control section 4 generates pre-output pages corresponding to the new processing-object image data. Thereafter, the processing flow moves on to step S15.

Figure 15:
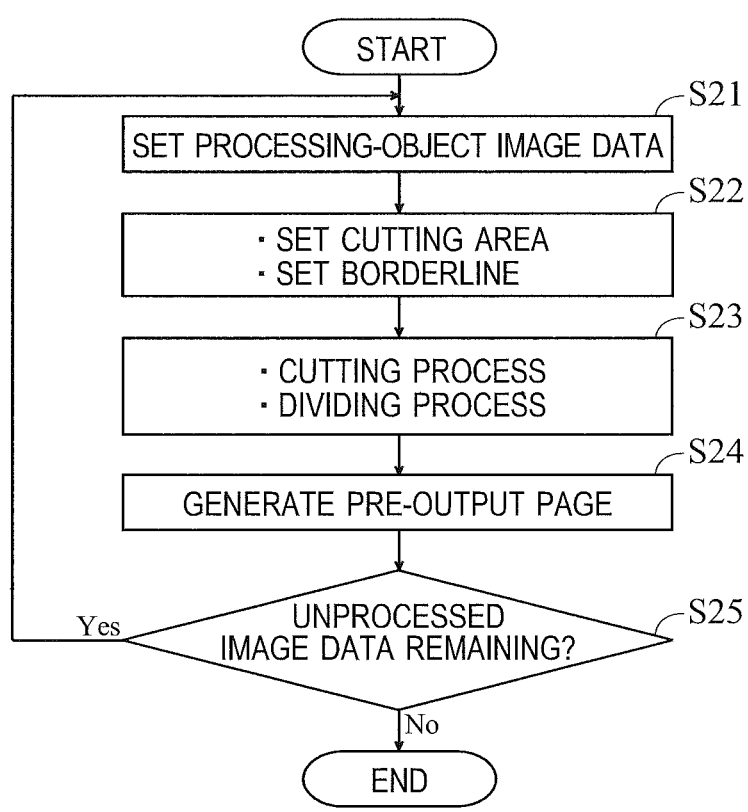
FIG. 15 is a flowchart for explaining a page generation process (second mode) to be performed by the control section in the image forming apparatus according to one embodiment of the disclosure.

With the page generation mode set to the second mode, the control section 4 executes the page generation process along a flowchart shown in FIG. 15. The flowchart of FIG. 15 gets started when the control section 4 decides that an end instruction for a book scan job has been accepted.

At step S21, the control section 4 sets, as a processing object, any of plural chunks of image data obtained by plural times of scans made by the image reading section 1. Then, at step S22, the control section 4 sets a cutting area CA and a borderline BL based on the processing-object image data.

At step S23, the control section 4 cuts out the cuffing area CA from the processing-object image data, and divides the cut-out cutting area CA along the borderline BL (i.e., executes the cutting process and the dividing process). Then, at step S24, the control section 4 generates, as pre-output pages (pre-output pages corresponding to the processing-object image data), a first pre-output page in which the divided image data of the one-side area A1 already subjected to image processing is provided and a second pre-output page in which the divided image data of the other-side area A2 already subjected to image processing is provided, respectively.

At step S25, the control section 4 decides whether or not there remains any unprocessed image data that has not yet been set as a processing object (image data whose corresponding pre-output page has not yet been generated). As a result, when the control section 4 decides that there remains unprocessed image data, the processing flow moves on to step S21; otherwise, when the control section 4 decides that there remains no unprocessed image data, this flow is ended.

Upon transition from step S25 to step S21, the control section 4 sets, as a new processing object, any of unprocessed image data that has not yet been set as a processing object. After the setting of a new processing object, the processing flow moves on to step S22. In this case, the control section 4 sets a cutting area CA and a borderline BL individually based on the new processing-object image data. Then, based on the set cutting area CA and borderline BL, the control section 4 executes the cutting process and the dividing process individually for the new processing-object image data.

As described hereinabove, the image forming apparatus 100 of this embodiment includes the image reading section 1 for scanning a double-page spread of a book-type document BD set on the contact glass CG, and the control section 4 for generating pre-output pages based on image data obtained by scanning by the image reading section 1. The control section 4 sets, as a cutting area CA, an area containing an entire document area DA with an image of the double-page spread out of processing-object image data, and further sets a borderline BL that divides an area corresponding to one page of a double-page spread out of the processing-object image data and another area corresponding to the other page of the double-page spread from each other. Moreover, the control section 4 divides the cutting area CA cut out from the processing-object image data into a one-side area A1 of the borderline BL and the other-side area A2 of the borderline BL. Then, the control section 4 generates, as pre-output pages, a first pre-output page in which the divided image data of the one-side area A1 is provided and a second pre-output page in which the divided image data of the other-side area A2 is provided.

With the configuration of this embodiment, as the image forming apparatus 100 is instructed to scan a double-page spread of a book-type document BD, a first pre-output page and a second pre-output page are generated as pre-output pages corresponding to the double-page spread. The first pre-output page is a pre-output page corresponding to one page of the double-page spread, and the second pre-output page is a pre-output page corresponding to the other page of the double-page spread. As a result of this, only by making the image forming apparatus 100 execute a one-time scan of a double-page spread of the book-type document BD (without the need for doing the work of setting the book-type document BD on the contact glass CG any plural times), it is achievable to divide pre-output pages corresponding to the double-page spread of the book-type document BD into a pre-output page corresponding to one page and another pre-output page corresponding to the other page.

Although the page generation process by the control section 4 may be executed after completion of the book scan job, yet it is also allowable that each time the image reading section 1 has made a scan of the book-type document BD, pre-output pages corresponding to currently obtained image data are generated by the control section 4. That is, pre-output pages may be generated during the execution of the book scan job.

Further, with the page generation mode set to the first mode, after the generation of pre-output pages corresponding to image data obtained by a scan of a specified ordinal-numbered time, a preview image corresponding to the pre-output pages may be displayed on the operation panel 3. As a result of this, the pre-output pages can be checked for their finished quality, hence the user's convenience.

<Editing of Pre-Output Pages>

After page data (PDF data) of pre-output pages have been saved in the custom box of the storage section 5, the user is allowed to edit the page data of the pre-output pages. The operation panel 3 accepts, from the user, an editing operation of editing the page data of pre-output pages. It is also allowable that the editing of page data of pre-output pages is enabled even from a user terminal (personal computer) connected to the image forming apparatus 100. The operation panel 3, prior to acceptance of the editing operation, accepts from the user a selection operation of selecting a file containing page data of pre-output pages.

Figure 16:
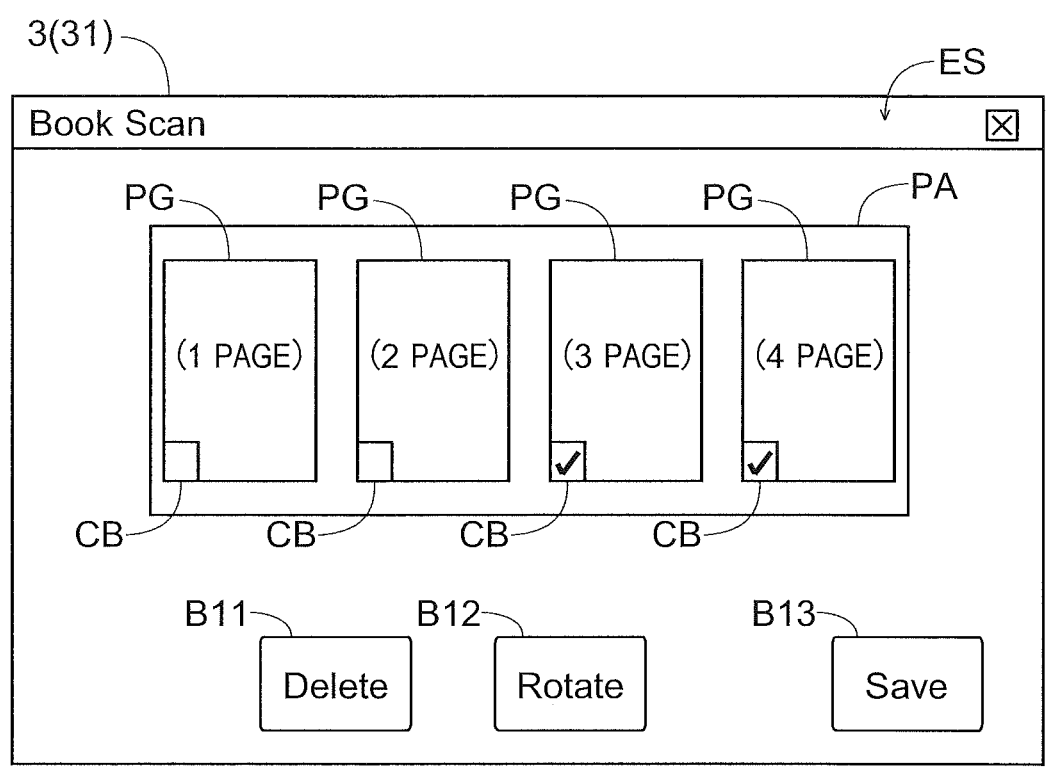
FIG. 16 is a view showing an edit screen to be displayed on the operation panel in the image forming apparatus according to one embodiment of the disclosure.

When the operation panel 3 has accepted a selection operation, the control section 4 generates preview images PG (see FIG. 16) corresponding to pre-output pages contained in the selected file (editing-object file). Then, the control section 4 makes such an edit screen ES as shown in FIG. 16 displayed on the operation panel 3 as a screen for accepting editing operations.

The edit screen ES includes a preview area PA. The preview images PG are displayed in the preview area PA. When a number of preview images PG that cannot be fully displayed in the preview area PA are present, preview images PG displayed in the preview area PA may be switched over by making a specified operation (flick operation or the like) on the preview area PA.

When an operation of touching any of the preview images PG is made, the control section 4 detects the operation as an instruction operation. Upon detecting an instruction operation, the control section 4 decides that a pre-output page corresponding to the preview image PG targeted for the instruction operation has been designated as an editing object. In addition, a check box CB is attached to each preview image PG. Then, check boxes CB of the preview images PG corresponding to editing-object pre-output pages are filled with check marks. Making a touch operation on a preview image PG having its check box CB filled with a check mark causes the pre-output page corresponding to the preview image PG subjected to the touch operation to be excluded from the editing objects (the check mark of the check box CB is eliminated).

In addition, a delete button B11, a rotate button B12, and a save button B13 are provided in the edit screen ES.

The delete button B11 is a software button for accepting a deletion instruction for editing-object pre-output pages from the user. When the control section 4 detects a deletion operation that is a touch operation on the delete button B11 under a condition that any pre-output page has been designated as an editing object (i.e., a condition that the check box CB of a preview image PG corresponding to the foregoing pre-output page is filled with a check mark), the control section 4 sets page data of the editing-object pre-output page as a deletion candidate (at this time point, page data of the editing-object pre-output page is not yet deleted). In this case, the preview image PG corresponding to the editing-object pre-output page is deleted from the preview area PA.

The rotate button B12 is a software button for accepting a rotation instruction for an editing-object pre-output page from the user. When the control section 4 detects a rotation operation that is a touch operation on the rotate button B12 under a condition that any pre-output page has been designated as an editing object (i.e., a condition that the check box CB of a preview image PG corresponding to the foregoing pre-output page is filled with a check mark), the control section 4 sets the editing-object pre-output page as a rotation candidate (at this time point, the editing-object pre-output page is not yet rotated). In this case, the preview image PG corresponding to the editing-object pre-output page is rotated by 180° (or 90°).

The save button B13 is a software button for accepting an editing-determination instruction in editing operations (deletion operation and rotation operation) from the user. The control section 4 detects a touch operation on the save button B13 as a determination instruction. The control section 4, upon detecting a determination instruction after execution of a deletion operation, deletes page data of a pre-output page corresponding to a preview image PG targeted for the deletion operation. Further, after execution of the rotation operation, the control section 4, upon detecting a determination instruction, rotates by 180° (or 90°) the pre-output page corresponding to the preview image PG targeted for the rotation operation.

In the state shown in FIG. 16, operating the delete button B11 and the save button B13 in this order allows two pre-output pages corresponding to the third-page preview image PG and the fourth-page preview image PG, respectively, to be deleted. Also in the state shown in FIG. 16, operating the rotate button B12 and the save button B13 in this order allows two pre-output pages corresponding to the third-page preview image PG and the fourth-page preview image PG, respectively, to be rotated.

In this embodiment, as described above, the control section 4 generates preview images PG corresponding to pre-output pages to display the preview images PG on the operation panel 3. As a result of this, the user is allowed to confirm the finished quality of pre-output pages, hence a good convenience.

Also in this embodiment, as described above, when the operation panel 3 has accepted a deletion instruction, the control section 4 deletes a pre-output page corresponding to a preview image PG of the user's designation. When the operation panel 3 has accepted a rotation instruction, the control section 4 rotates a pre-output page corresponding to a preview image PG of the user's designation. As a result of this, the user is allowed to edit page data of pre-output pages (PDF data obtained by bundling together pre-output pages resulting from one batch of the book scan job) after scanning of a double-page spread of a book-type document BD. Thus, the user's convenience is improved.

The embodiment disclosed herein should be construed as not being limitative but being an exemplification at all points. The scope of the disclosure is defined not by the above description of the embodiment but by the appended claims, including all changes and modifications equivalent in sense and range to the claims.

What is claimed is:

1. An image forming apparatus, comprising:
an image reading section for scanning a double-page spread of a book-type document set on a contact glass;
a control section for generating a pre-output page based on image data obtained by scanning by the image reading section; and
an operation panel for accepting, from a user, a start instruction and an end instruction for a job of scanning the book-type document;
wherein
the control section sets, as a cutting area, an area containing an entire document area in which an image of the double-page spread out of the image data is present, sets a borderline which divides an area corresponding to one page of the double-page spread out of the image data and an area corresponding to the other page of the double-page spread from each other, and divides the cutting area cut out from the image data into a one-side area of the borderline and an other-side area of the borderline, whereby the control section generates, as the pre-output pages, a first pre-output page in which divided image data of the one-side area is provided and a second pre-output page in which divided image data of the other-side area is provided, and
in a case where the image reading section has made plural times of scans during a period from the operation panel's acceptance of the start instruction until its acceptance of the end instruction, for generation of the pre-output page based on the image data obtained by a scan of a specified ordinal-numbered time out of the plural times of scans, the control section sets the cutting area and the borderline based on the image data obtained by the scan of the specified ordinal-numbered time, and for generation of the pre-output page based on the image data obtained by a scan other than the scan of the specified ordinal-numbered time out of the plural times of scans, the control section cuts out, from the image data obtained by the scan other than the scan of the specified ordinal-numbered time, an area positioned congruous with the cutting area set based on the image data obtained by the scan of the specified ordinal-numbered time, and divides the cut-out area along a line positioned congruous with the borderline set based on the image data obtained by the scan of the specified ordinal-numbered time.

2. An image forming apparatus, comprising:
an image reading section for scanning a double-page spread of a book-type document set on a contact glass;
a control section for generating a pre-output page based on image data obtained by scanning by the image reading section; and
an operation panel for accepting, from a user, a start instruction and an end instruction for a job of scanning the book-type document;
wherein
the control section sets, as a cutting area, an area containing an entire document area in which an image of the double-page spread out of the image data is present, sets a borderline which divides an area corresponding to one page of the double-page spread out of the image data and an area corresponding to the other page of the double-page spread from each other, and divides the cutting area cut out from the image data into a one-side area of the borderline and an other-side area of the borderline, whereby the control section generates, as the pre-output pages, a first pre-output page in which divided image data of the one-side area is provided and a second pre-output page in which divided image data of the other-side area is provided, and
in a case where the image reading section has made plural times of scans during a period from the operation panel's acceptance of the start instruction until its acceptance of the end instruction, the control section sets the cutting area and the borderline for each of plural chunks of the image data obtained by the plural times of scans.

3. An image forming apparatus, comprising:
an image reading section for scanning a double-page spread of a book-type document set on a contact glass; and
a control section for generating a pre-output page based on image data obtained by scanning by the image reading section;
wherein
the control section sets, as a cutting area, an area containing an entire document area in which an image of the double-page spread out of the image data is present, sets a borderline which divides an area corresponding to one page of the double-page spread out of the image data and an area corresponding to the other page of the double-page spread from each other, and divides the cutting area cut out from the image data into a one-side area of the borderline and an other-side area of the borderline, whereby the control section generates, as the pre-output pages, a first pre-output page in which divided image data of the one-side area is provided and a second pre-output page in which divided image data of the other-side area is provided,
the cutting area is a quadrangular area having two pairs of opposite sides, one pair of opposite sides being parallel to a main scanning direction and the other pair of opposite sides being parallel to a sub scanning direction,
the control section sets, as a first reference side, one of the sides parallel to the main scanning direction out of the four sides of the image data, and sets, as a second reference side, one of the sides parallel to the sub scanning direction,
the control section recognizes positions of four corners of the document area present in the image data, and determines, as a first distance, a distance in the sub scanning direction between a position of a corner nearest to the first reference side out of the four corners and a position of a corner farthest from the first reference side, and moreover determines, as a second distance, a distance in the main scanning direction between a position of a corner nearest to the second reference side out of the four corners and a position of a corner farthest from the second reference side, and
the control section sets, as the cutting area, the quadrangular area which contains the entire document area and in which a distance between the opposite sides parallel to the main scanning direction equals the first distance and a distance between the opposite sides parallel to the sub scanning direction equals the second distance.

4. The image forming apparatus according to claim 3, wherein one of the main scanning direction and the sub scanning direction is set as a page array direction, it is preconditioned that the book-type document is to be set on the contact glass in such a fashion that the one page and the other page are arrayed in the page array direction, and the control section sets, as the borderline, a line which passes through a center of the cutting area in the page array direction so as to orthogonally intersect the page array direction.

5. An image forming apparatus, comprising:

an image reading section for scanning a double-page spread of a book-type document set on a contact glass, a control section for generating a pre-output page based on image data obtained by scanning by the image reading section; and an operation panel for accepting, from a user, a start instruction and an end instruction for a job of scanning the book-type document and moreover for accepting a scan interval from the user;

wherein the control section sets, as a cutting area, an area containing an entire document area in which an image of the double-page spread out of the image data is present, sets a borderline which divides an area corresponding to one page of the double-page spread out of the image data and an area corresponding to the other page of the double-page spread from each other, and divides the cutting area cut out from the image data into a one-side area of the borderline and an other-side area of the borderline, whereby the control section generates, as the pre-output pages, a first pre-output page in which divided image data of the one-side area is provided and a second pre-output page in which divided image data of the other-side area is provided, and the control section instructs the image reading section to repeatedly execute scanning at the scan interval accepted by the operation panel during a period from the operation panel's acceptance of the start instruction until its acceptance of the end instruction.

6. An image forming apparatus, comprising:

an image reading section for scanning a double-page spread of a book-type document set on a contact glass;

a control section for generating a pre-output page based on image data obtained by scanning by the image reading section; and an operation panel for displaying an image;

wherein the control section sets, as a cutting area, an area containing an entire document area in which an image of the double-page spread out of the image data is present, sets a borderline which divides an area corresponding to one page of the double-page spread out of the image data and an area corresponding to the other page of the double-page spread from each other, and divides the cutting area cut out from the image data into a one-side area of the borderline and an other-side area of the borderline, whereby the control section generates, as the pre-output pages, a first pre-output page in which divided image data of the one-side area is provided and a second pre-output page in which divided image data of the other-side area is provided;

the control section generates a preview image corresponding to the pre-output page and displays the preview image on the operation panel, the operation panel accepts a designation of the preview image from a user and moreover accepts a deletion instruction and a rotation instruction from the user, and when the operation panel has accepted the deletion instruction, the control section deletes the pre-output page corresponding to the preview image of the user's designation, and when the operation panel has accepted the rotation instruction, the control section rotates the pre-output page corresponding to the preview image of the user's designation.

* * * * *